JEAN-BAPTISTE MARIUS BENONIN LAGGIARD.
MUD GUARD FOR MOTOR CARS.
APPLICATION FILED AUG. 20, 1919.

1,387,412.

Patented Aug. 9, 1921.

INVENTOR
J.B.M.B. Laggiard
BY
HIS ATTORNEYS.

UNITED STATES PATENT OFFICE.

JEAN-BAPTISTE MARIUS BENONIN LAGGIARD, OF MARSEILLE, FRANCE.

MUDGUARD FOR MOTOR-CARS.

1,387,412. Specification of Letters Patent. Patented Aug. 9, 1921.

Application filed August 20, 1919. Serial No. 318,706.

*To all whom it may concern:*

Be it known that I, JEAN-BAPTISTE MARIUS BENONIN LAGGIARD, a citizen of the French Republic, residing at Marseille, France, have invented certain new and useful Improvements in Mudguards for Motor-Cars; and I do hereby declare that the following is a full, clear, and exact description of the same.

The invention relates to a wheel mud guard for motor vehicles, including a screen arranged for convenient securing in place, and capable of yielding without injury on meeting obstructions or in the collapse of the tire.

The invention is directed to a screen member, which while sufficiently flexible to yield when meeting an obstruction is yet of sufficient inherent rigidity to normally maintain a proper screen position with relation to the tire. The screen proper includes a lateral foot formed to coöperate with a wheel-rim extension and to be removably secured thereto.

In the drawings:—

Figure 3:
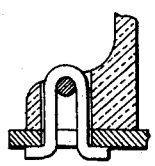
Figure 4:
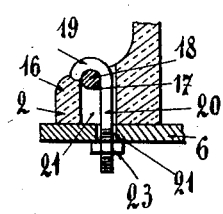
Figure 5:
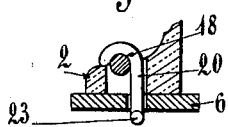

Figs. 3, 4, and 5 are broken sectional views, showing modified securing means.

Figure 6:
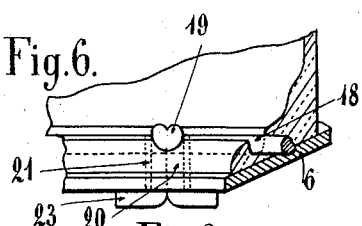

Fig. 6 is a perspective showing the type of securing means shown in Fig. 5.

Figure 7:
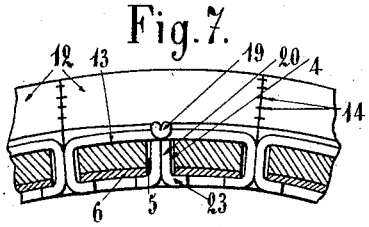

Fig. 7 is a view in elevation, partly in section, showing a sectional screen and rim-securing means therefor.

Figure 8:
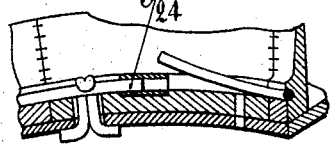

Fig. 8 is a similar view with a modified form of securing means.

The improved wheel mud guard comprises a screen section 1 preferably of rubber, either with or without a stiffening of canvas, which screen is co-extensive with the wheel rim, and is formed with a lateral foot 2, adapted to rest upon an extension 6 of the wheel rim. A cable or rod 3 is passed through an opening in the foot and thus overlies the rim extension circumferentially of the same. At intervals, the foot 2 and rim extension 6 are formed with openings, as 4 and 5, adapted to register when the screen is applied, and a fastening means 7 is extended through said holes. This fastening means, in the form shown in Figs. 1, 2, and 3 in the form of a loop overlying the rod 3, and the terminals 9 are bent laterally beneath the rim extension 6.

Figure 1:
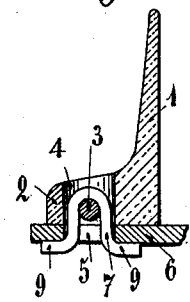
Figure 1 is a sectional view illustrating one means for securing the screen to the wheel-rim extension.
Figure 2:
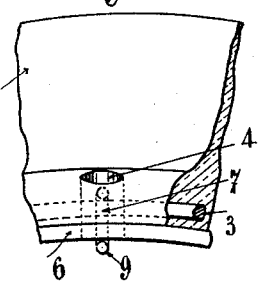
Fig. 2 is a broken elevation of the same.

The construction shown in Fig. 3 differs from that described simply in that the cable or rod 3 rests in a channel in the outer surface of the foot, instead of passing through the foot, as in Figs. 1 and 2.

In Figs. 4, 5, and 6, the cable or rod 18 passes through a channel 17 in the outer face of the foot, and the fastening means of Fig. 4 comprises a hook-bolt 20 passed through the openings 21 in the screen foot and rim extension 6. The hook 19 of the bolt engages over the rod or cable 18 and the nut 23 on the threaded end of such bolt, secures the fastener in place.

The fastening means of Figs. 5 and 6 comprises a hook bolt 20 as in Fig. 4; except that the bolt is double and the free ends 23 are bent laterally beneath the wheel rim extension 6.

In the forms previously described, the screen is an integral member, and must thus more or less accurately fit the wheel rim. The invention contemplates, however the construction of the screen in sections as at 12, Figs. 7 and 8, adapted to be secured together as may be necessary to complete the screen structure, by hooks 14 at their meeting edges.

With this sectional screen form, the fastening means of Fig. 7 includes a wire loop 13 for each section of screen, which loop passes over the foot of the screen section, preferably seating in a groove in such foot, with the ends of the loop passed downwardly between adjacent ends of the feet of the respective sections, preferably through holes formed partly in each foot. The ends of the loop are bent toward each other beneath the rim extension 6. Hooks 20 with the hook ends 19 engaging the loop 13, and the body of the hooks passed through registering openings 4 and 5 in the screen foot and rim extension 6, have their free ends 23 bent laterally beneath the rim extension. This hook connection is identical with that shown in Figs. 5 and 6, and the method of securing the screen sections in place as shown in Fig. 7, is of decided advantage, as it permits the ready and convenient disconnection of any one screen section, as desired, without disturbing the other screen sections.

The meeting edges of the screen sections may be left free of any connection, such as hooks 14, if desired, without materially interfering with the efficiency of the screen.

Fig. 8 shows a construction similar to that of Fig. 7, except that the screen sections are secured by a single rod or cable 24, with one end provided with a sleeve 25 to receive the other end of such rod or cable. The fastening means for the rim connection is identical with that described in connection with Fig. 7.

What is claimed as new, is:—

1. A wheel mud guard comprising a screen made up of a plurality of sections, means for securing the sections removably together, and means for independently securing such sections to a wheel-rim extension.

2. A wheel mudguard comprising a screen having a lateral foot formed with a channel, a wire coöperating with said channel and a series of independent securing elements passing through said foot and rim, said elements removably overlying and embracing the wire and being spread below the wheel rim.

3. A wheel mudguard comprising a screen made up of a plurality of sections, a fastening member to overlie a portion of each section and engage beneath the wheel rim, and means to engage said member and interlock with the wheel rim.

4. A wheel mudguard comprising a screen made up of a plurality of independent sections, a wire element overlying a portion of each section and passed through and beneath the wheel rim, and a hook member engaging said wire with its ends passed through and engaged beneath the wheel rim.

In testimony whereof I affix my signature in presence of two witnesses.

JEAN-BAPTISTE MARIUS BENONIN LAGGIARD.

Witnesses:
 MARIEN CAMISIER,
 AUG. MOSHET.